(12) United States Patent
Lynn et al.

(10) Patent No.: US 7,765,365 B2
(45) Date of Patent: Jul. 27, 2010

(54) METHOD OF PARTIONING STORAGE IN SYSTEMS WITH BOTH SINGLE AND VIRTUAL TARGET INTERFACES

(75) Inventors: James A. Lynn, Rose Hill, KS (US); Kevin F. Lindgren, Newton, KS (US)

(73) Assignee: LSI Corporation, Milpitas, CA (US)

( * ) Notice: Subject to any disclaimer, the term of this patent is extended or adjusted under 35 U.S.C. 154(b) by 96 days.

(21) Appl. No.: 11/283,232

(22) Filed: Nov. 18, 2005

(65) Prior Publication Data

US 2007/0118716 A1    May 24, 2007

(51) Int. Cl.
G06F 13/14    (2006.01)
G06F 12/06    (2006.01)

(52) U.S. Cl. ........................... 711/153; 711/173
(58) Field of Classification Search ............. 711/173, 711/153; 709/213, 215
See application file for complete search history.

(56) References Cited

U.S. PATENT DOCUMENTS

| | | | | |
|---|---|---|---|---|
| 5,941,972 A | * | 8/1999 | Hoese et al. ............ | 710/315 |
| 6,671,727 B1 | * | 12/2003 | Odenwald ............... | 709/227 |
| 7,249,227 B1 | * | 7/2007 | Pittman ................... | 711/154 |
| 2003/0061399 A1 | * | 3/2003 | Wagener et al. ......... | 709/321 |
| 2003/0177174 A1 | * | 9/2003 | Allen et al. ............. | 709/203 |
| 2004/0111485 A1 | * | 6/2004 | Mimatsu et al. ......... | 709/213 |
| 2005/0144384 A1 | * | 6/2005 | Eguchi et al. ........... | 711/114 |
| 2005/0157730 A1 | * | 7/2005 | Grant et al. ............. | 370/401 |
| 2006/0080416 A1 | * | 4/2006 | Gandhi ................... | 709/220 |
| 2006/0174088 A1 | * | 8/2006 | Justiss et al. ............ | 711/202 |
| 2006/0248047 A1 | * | 11/2006 | Grier et al. .............. | 707/2 |

OTHER PUBLICATIONS

"Sun StorEdge™ SCSI Target Emulation (STE) 1.1 Release Notes," Sun Microsystems, Inc., Aug. 1999. Accessed Jul. 9, 2009 from http://docs.sun.com/app/docs/doc/806-1948-10.*

* cited by examiner

*Primary Examiner*—Hetul Patel
*Assistant Examiner*—Hal Schnee
(74) *Attorney, Agent, or Firm*—Suiter Swantz pc llo

(57) ABSTRACT

A method of partitioning storage is provided. In an exemplary embodiment, the method includes connecting at least one initiator with at least one target device. Upon connection of the at least one initiator with the at least one target device, at least one initiator-target association object may be created. The method may also include selecting at least one storage partition with the at least one initiator-target association object.

12 Claims, 7 Drawing Sheets

METHOD OF PARTIONING STORAGE IN SYSTEMS WITH BOTH SINGLE AND VIRTUAL TARGET INTERFACES

FIELD OF THE INVENTION

The present invention relates to the field of computer systems and information storage and more particularly, to a method of partitioning storage in systems with both single- and virtual-target interfaces.

BACKGROUND OF THE INVENTION

A small computer system interface (SCSI) is an industry-standard interface for connecting certain peripheral devices, particularly mass storage units such as disk drives, to a computer system. Such interfaces have been demonstrated to be capable of providing high speed access to peripheral devices. For instance, SCSI interfaces are preferred over other interfaces such as integrated/intelligent drive electronic (IDE) interfaces for connecting mass storage units because of their high data rate.

The existing SCSI Architecture Model describes a logical unit as an attribute of a target device. However, not all SCSI transport protocols allow the partitioning of storage by using the target device. Partitioning storage is a term which describes sub-dividing of the storage within a storage system into partitions and allowing each of the multiple SCSI initiators that are connected to it access to a subset of the partitions. A typical sub-division of a storage system is illustrated in FIG. 1 in which the system is sub-divided into three partitions with four hypothetical initiators which have access to only part of the data in the storage system.

Two main approaches, Fibre Channel and iSCSI (Internet Small Computer System Interface), are currently employed for the storage of data transmissions over Internet-Protocol (IP) networks. Both Fibre Channel and iSCSI support block access for storage using a SCSI command set and are useful for performing general data access as well as data backup. Fibre Channel, in particular, associates the SCSI target with the Fibre Channel node name, an attribute of the physical interface. Further, existing systems with Fibre Channel interfaces partition storage by using a virtual-target interface or a single-target interface. The Fibre Channel interface which employs a virtual-target interface involves an interface chip which is programmed to act like multiple Fibre Channel nodes whereby one node is assigned for each target. In contrast, the single-target interface relies upon the storage partition algorithm using the initiators' Fibre Channel names to select which partition of storage is being accessed.

For Fibre Channel, the single-target interface is often chosen over the virtual-target interface because many interface chips do not support the virtual-target interface. FIG. 2A demonstrates the relationships used to implement Fibre Channel partitions when the interface chip is unable to provide multiple targets. As illustrated in FIG. 2A, the initiator information is used to select the partition, which in turn, selects the volumes which are accessible to the initiator.

In contrast to Fibre Channel, the iSCSI standard specifically abstracts the target as an entity not associated with the physical interface to more closely adhere to the SCSI Architecture Model. Exisiting systems with iSCSI partition storage by employing either the initiator's name (i.e., a single-target system) or the target (i.e., a virtual-target system) to select which partition of storage is to be accessed. FIG. 2B demonstrates the relationship used to implement iSCSI partitions where virtual targets are used. As illustrated in FIG. 2B, the target which is being addressed is used to select the partition.

Although Fibre Channel interfaces and iSCSI have increased the ability to store data transmissions over IP networks, such interfaces are disadvantageous under certain situations. For example, the methods employed by either iSCSI or Fibre Channel interfaces for partitioning storage do not address systems which require use of both single-target and virtual-target interfaces.

Therefore, it would be desirable to provide a method for partitioning storage for systems which need to support both single-target and virtual-target interfaces.

SUMMARY OF THE INVENTION

The present invention is directed to a method of partitioning storage. In an aspect of the present invention, the method of partitioning storage includes connecting at least one initiator with at least one target device. Upon connection of the at least one initiator with the at least one target device, at least one initiator-target association object may be created. The method may also include selecting at least one storage partition with the at least one initiator-target association object.

In a further aspect of the present invention, a method of partitioning storage for a system with a single-target interface and a virtual-target interface is provided. The method may include connecting at least one initiator with at least one target device. The method may also include creating an initiator-target association object for each of the at least one initiator for supporting a single-target interface implementation. In turn, for supporting a virtual-target interface implementation, the method may also include creating an initiator-target association object for each connection between the at least one initiator and the at least one target device. The at least one initiator-target association object may be employed to select at least on storage partition.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
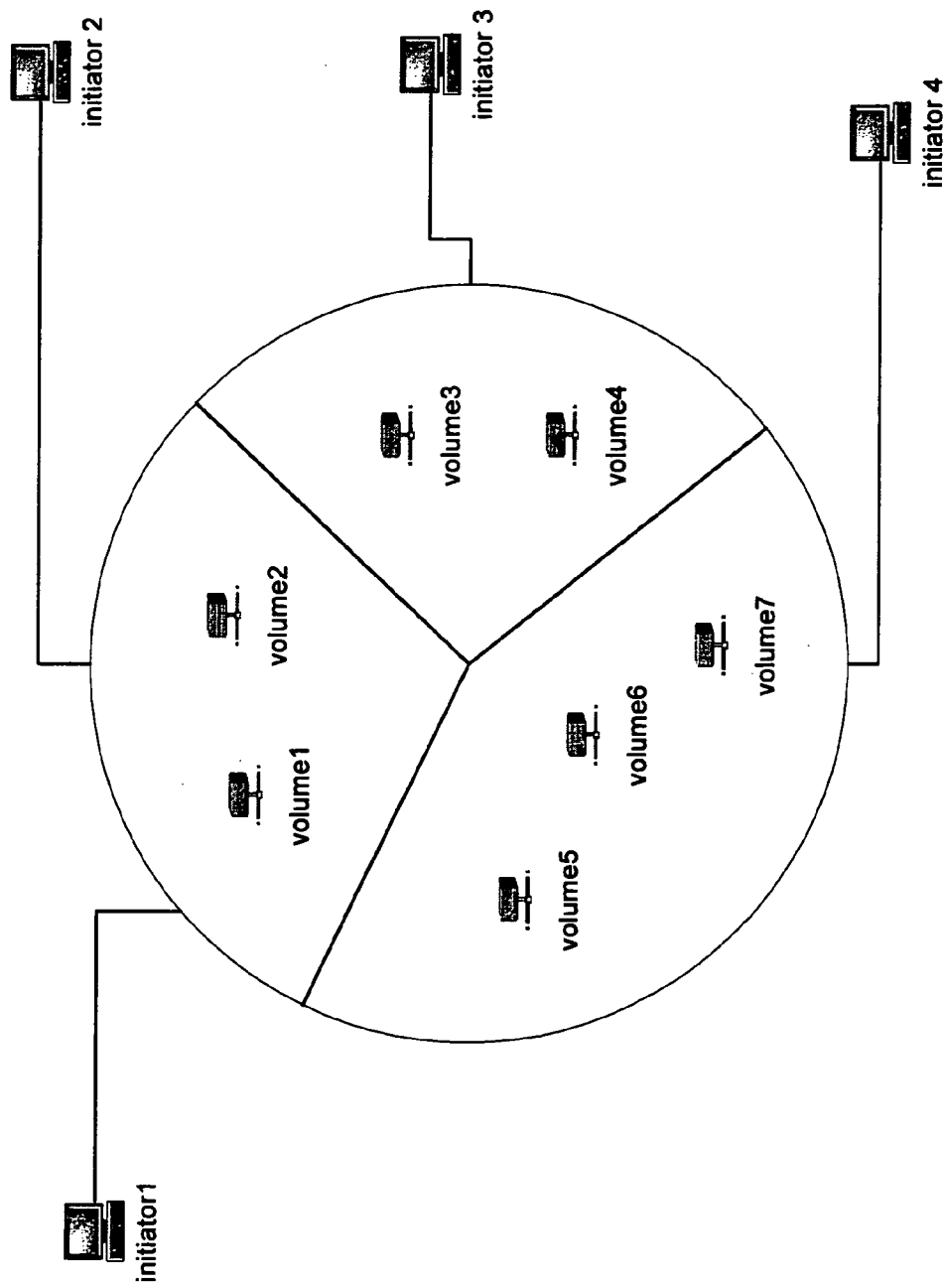
FIG. 1 is a schematic diagram of an exemplary prior art SCSI storage system.
Figure 2:
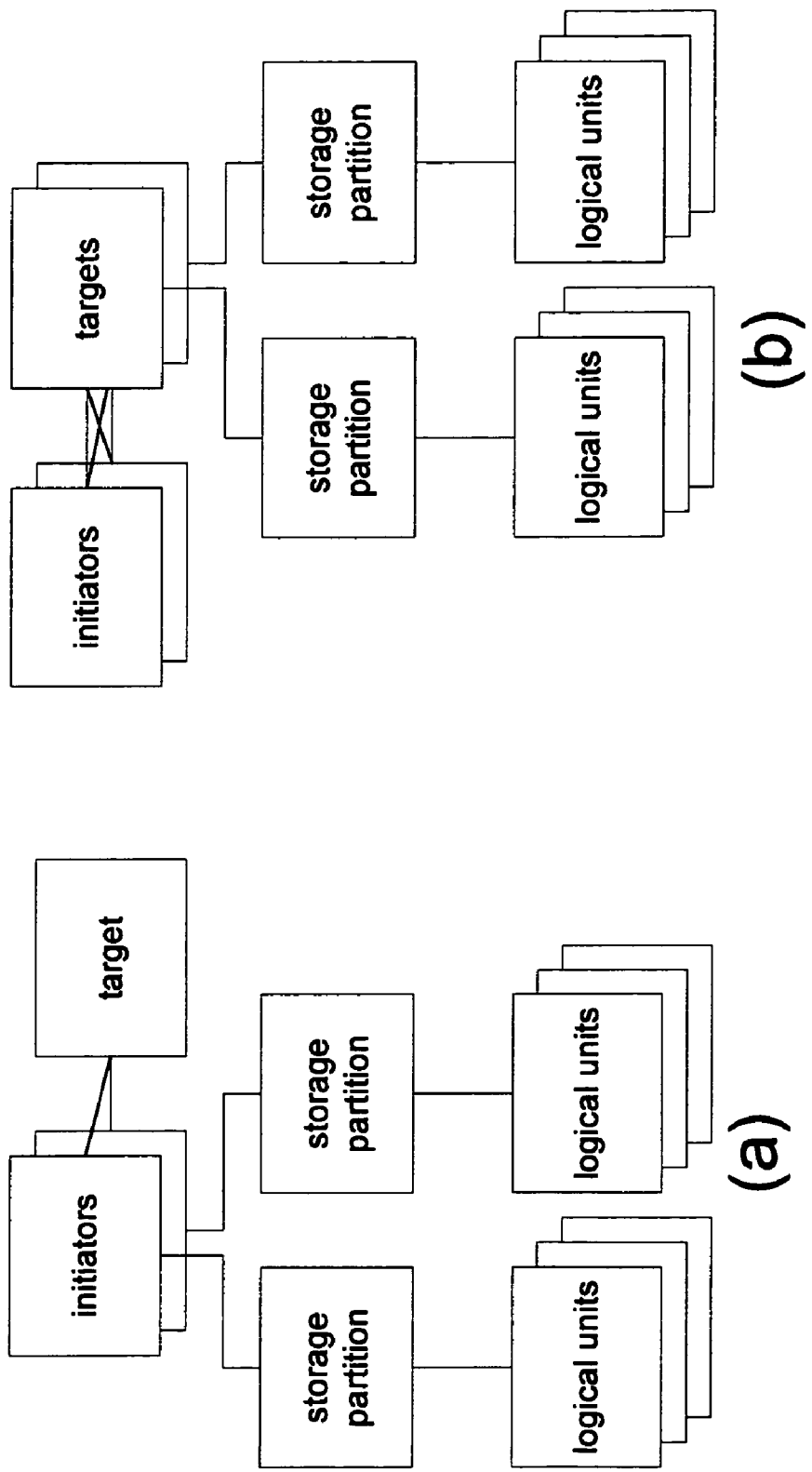
FIG. 2A is block diagram of exemplary prior art Fibre Channel partitions, wherein the relationships used to implement Fibre Channel partitions when the interface chip is not capable of providing multiple targets are illustrated.
FIG. 2B is a block diagram of exemplary prior art iSCSI partitions, wherein the relationships used to implement iSCSI parititions where virtual targets are used are provided.
Figure 3:
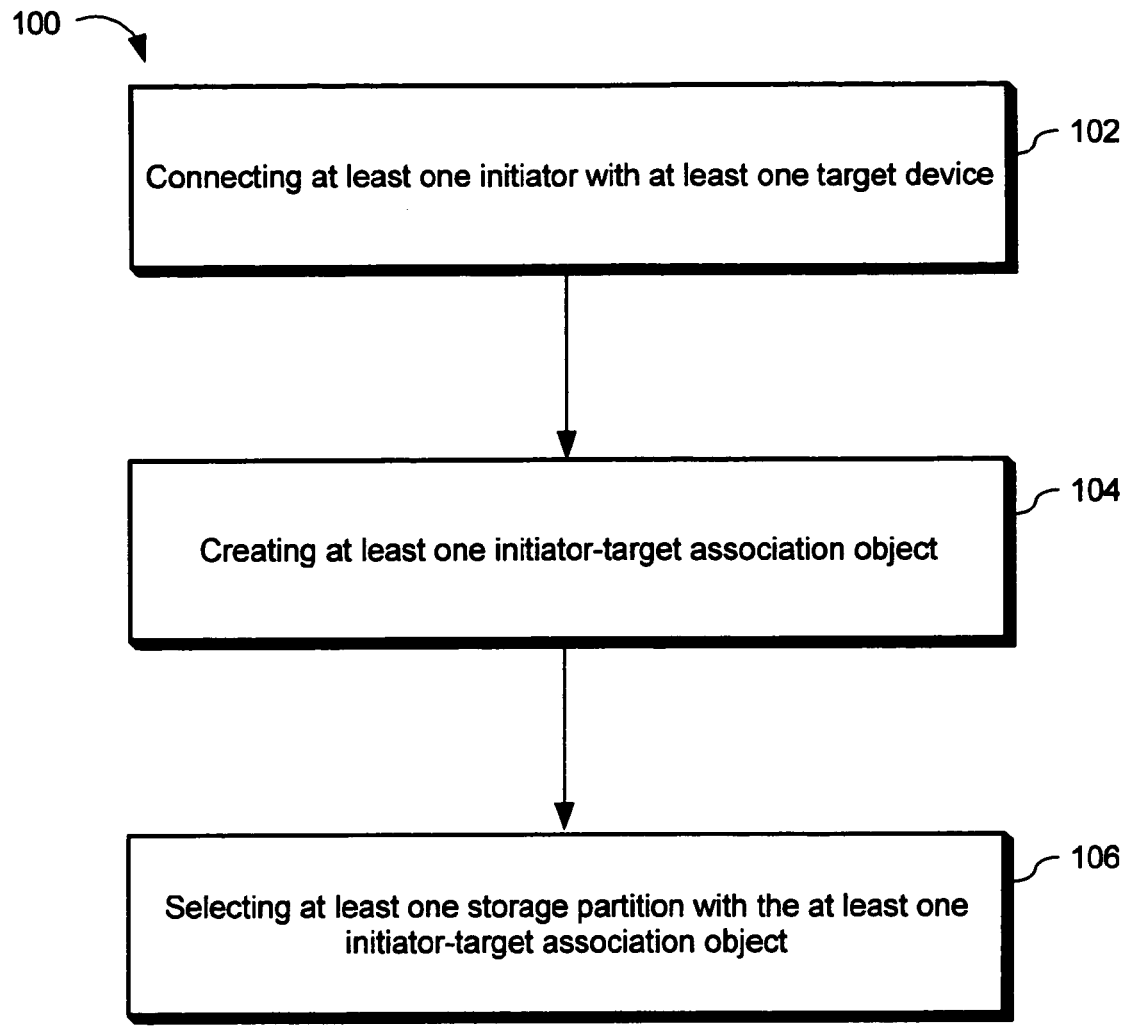
FIG. 3 is a flow diagram of a method of partitioning storage in accordance with an exemplary embodiment of the present invention.

Referring to FIG. 3, a method 100 of partitioning storage is provided. In an exemplary embodiment of the present invention, the method 100 of partitioning storage includes connecting at least one initiator with at least one target device 102. In an embodiment, the at least one initiator is a small computer system interface (SCSI) initiator. In a further embodiment, the at least one target device is a small computer system interface (SCSI) target device. The method 100 may also include creating at least one initiator-target association object 104. For example, upon connection of the at least one initiator with the at least one target device, the at least one initiator-target association object is generated. The method 100 may also include selecting at least one storage partition with the at least one initiator-target association object 106.

In further exemplary embodiments, the method 100 of partitioning storage supports single-target Fibre Channel implementations and virtual-target iSCSI implementations. For example, single-target Fibre Channel implementations are supported by the at least one initiator being a plurality of initiators and the at least one target device being a single target device in which each of the plurality of initiators associates with the single target device. Further, for virtual-target iSCSI implementations, each of the at least one initiator-target association object with the same target select the same storage partition.

Figure 4:
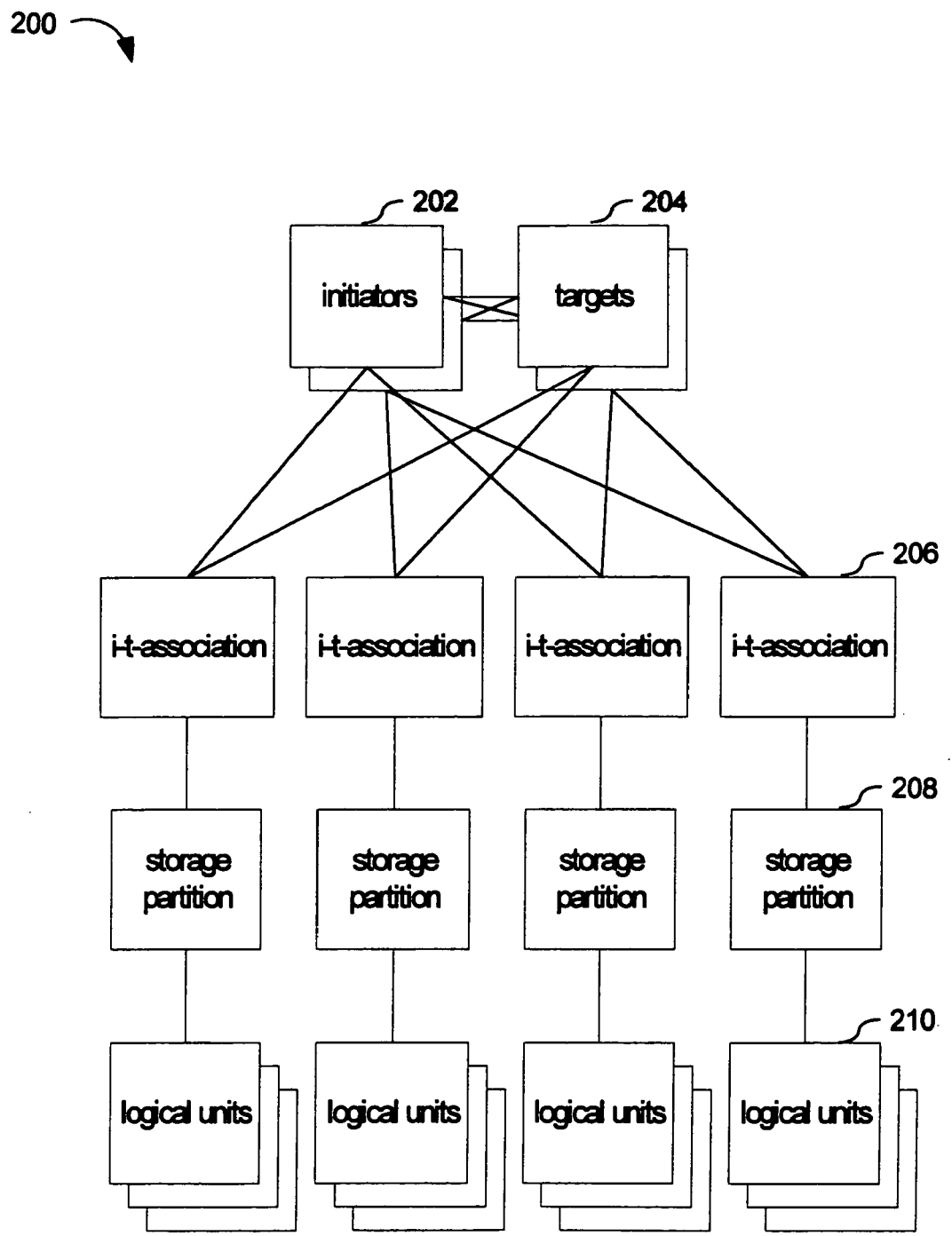
FIG. 4 is a block diagram of a system capable of supporting both virtual-target and single target interfaces in accordance with an exemplary embodiment of the present invention, wherein the relationship of the initiators and the target devices is provided.

Referring to FIG. 4, a system 200 capable of supporting both virtual-target and single target interfaces in accordance with an exemplary embodiment of the present invention is provide in which the relationship of the initiators and the target devices is shown. As illustrated in FIG. 4, the system 200 may include a number of initiators 202 and a number of targets 204. In an embodiment, each initiator 202 may connect with a target 204 and create a initiator-target (i-t) association object 206. Each i-t association object 206 may be used to select a storage partition 208. In an embodiment, each storage partition 208 includes a number of logical units 210. The system 200 supports single-target Fibre Channel implementations because a specific i-t association object is created for each initiator 202 and each of the i-t association objects use the same target. In addition, the system 200 supports virtual-target iSCI implementations because a specific i-t association object is created for each initiator-target combination. Here, in FIG. 4, each i-t association object with the same target use the same partition.

Figure 5:
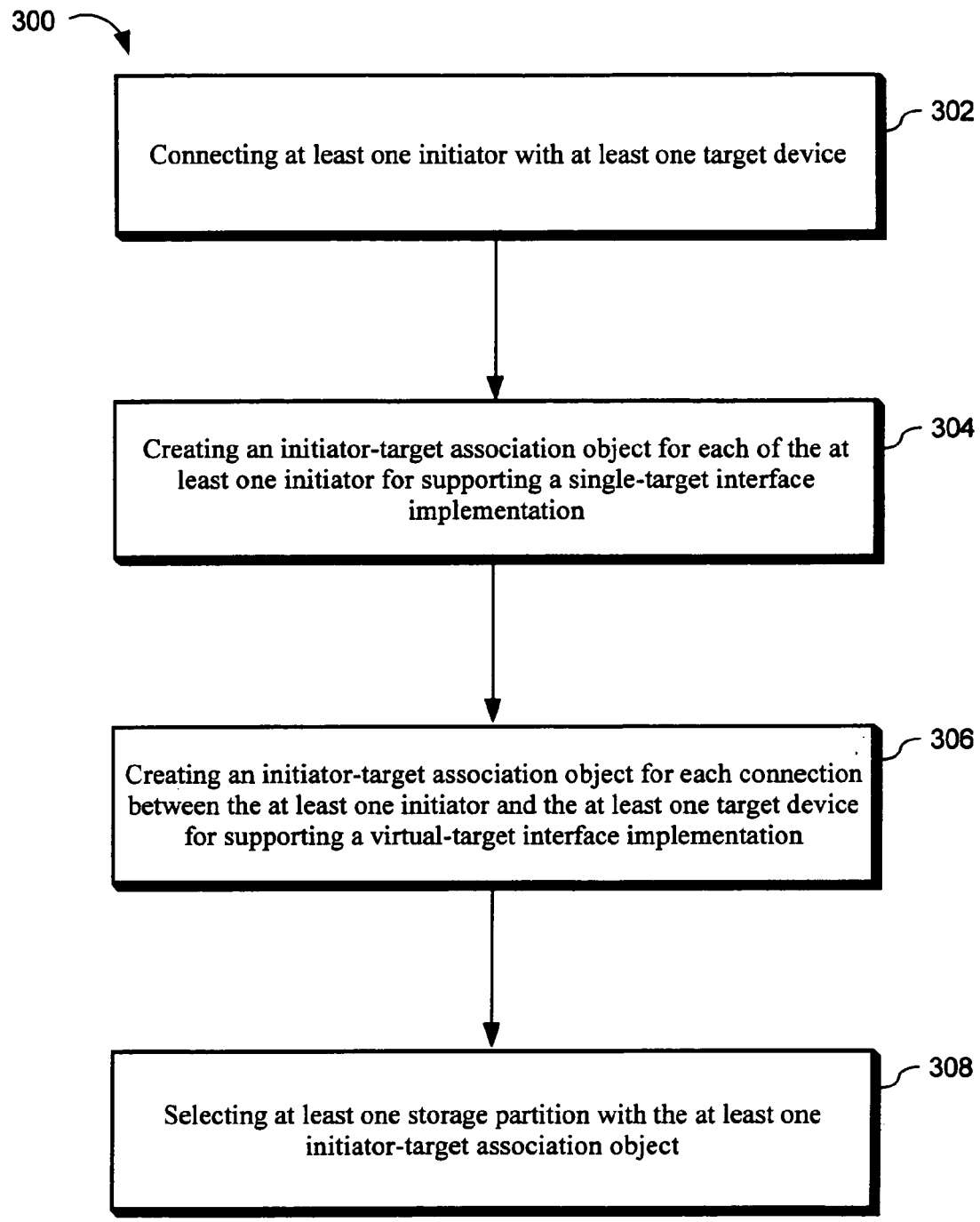
FIG. 5 is a flow diagram of an additional method of partitioning storage in accordance with an exemplary embodiment of the present invention.

Referring to FIG. 5, a method 300 of partitioning storage for a system with a single-target interface and a virtual-target interface is provided. In an exemplary embodiment of the present invention, the method 300 may include connecting at least one initiator with at least one target device 302. For instance, the at least one initiator is a SCSI initiator and the at least one target device is a SCSI target device. The method 300 may also include creating an initiator-target association object for each of the at least one initiator for supporting a single-target interface implementation 304. In turn, for supporting a virtual-target interface implementation, the method 300 may also include creating an initiator-target association object for each connection between the at least one initiator and the at least one target device 306. For example, the method 300 may support a single-target Fibre Channel interface implementation and a virtual-target iSCSI implementation. In a further embodiment, the method 300 includes selecting at least one storage partition with the at least one initiator-target association object 308. For supporting the virtual-target interface implementation, each of the at least one initiator-target association object with the same target select the same storage partition.

Figure 6:
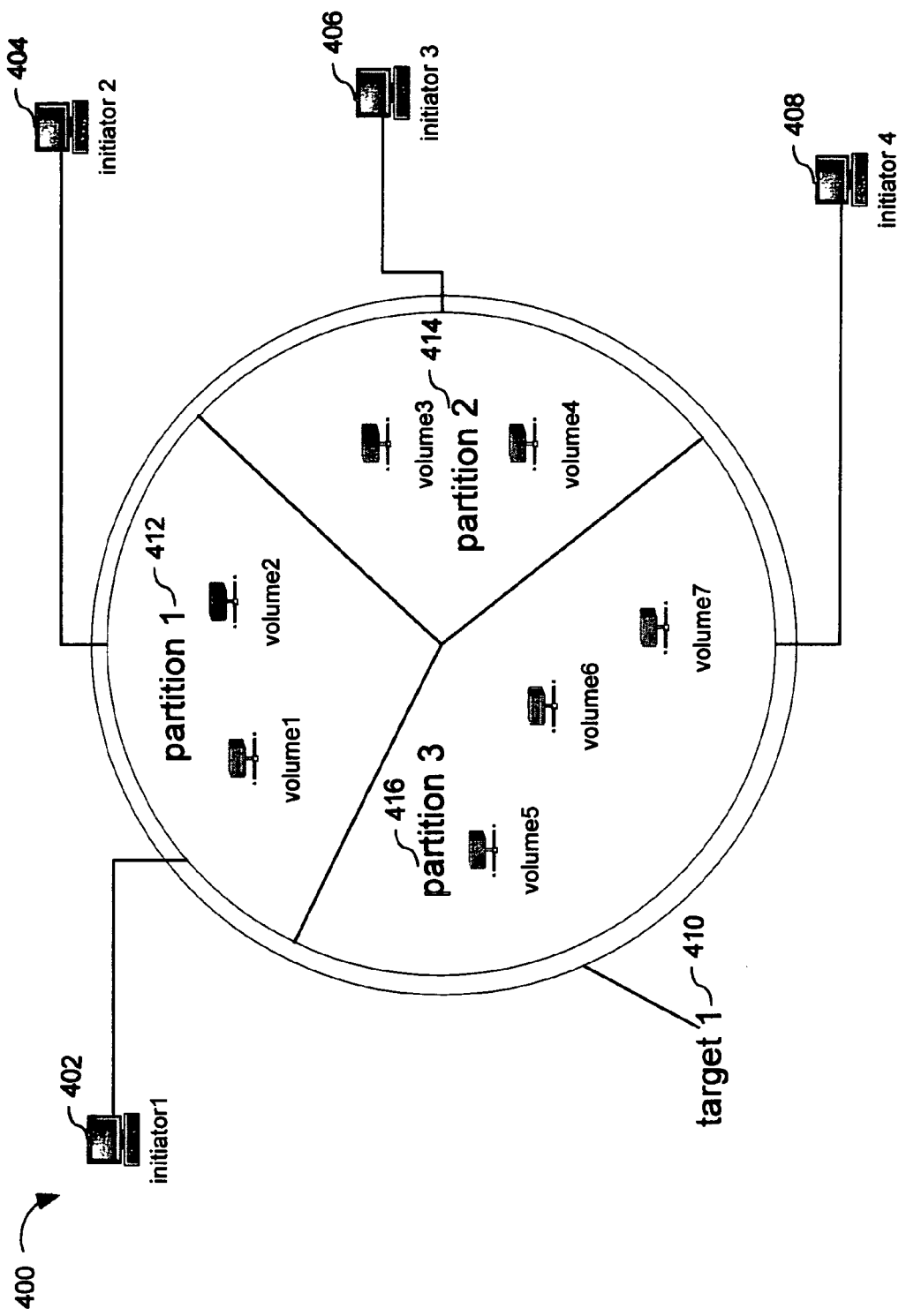
FIG. 6 is a schematic diagram of a partitioned single-target Fibre Channel implementation in accordance with an exemplary embodiment of the present invention.

Referring to FIG. 6, a partitioned single-target Fibre Channel implementation 400 in accordance with an exemplary embodiment of the present invention is provided. In an exemplary embodiment, a partitioned single-target Fibre Channel implementation 400 includes a plurality of initiators and a single target device 410. As illustrated in FIG. 6, four initiators denoted as 402 (initiator 1), 404 (initiator 2), 406 (initiator 3), and 408 (initiator 4) may be included within the plurality of initiators. In the present example, the connection of each of the four initiators with the target device 410 results in four initiator-target association objects being created. Further, in such example, the four initiator-target association objects select three storage partitions. For instance, initiator 402 and target 410 use partition 412 (partition 1), initiator 404 and target 410 use partition 412 (partition 1), initiator 406 and target 410 use partition 414 (partition 2), and initiator 408 and target 412 use partition 416 (partition 3). Such configuration allows the storage of data transmissions over IP networks with Fibre Channel interfaces using single-target Fibre Channel implementations.

Figure 7:
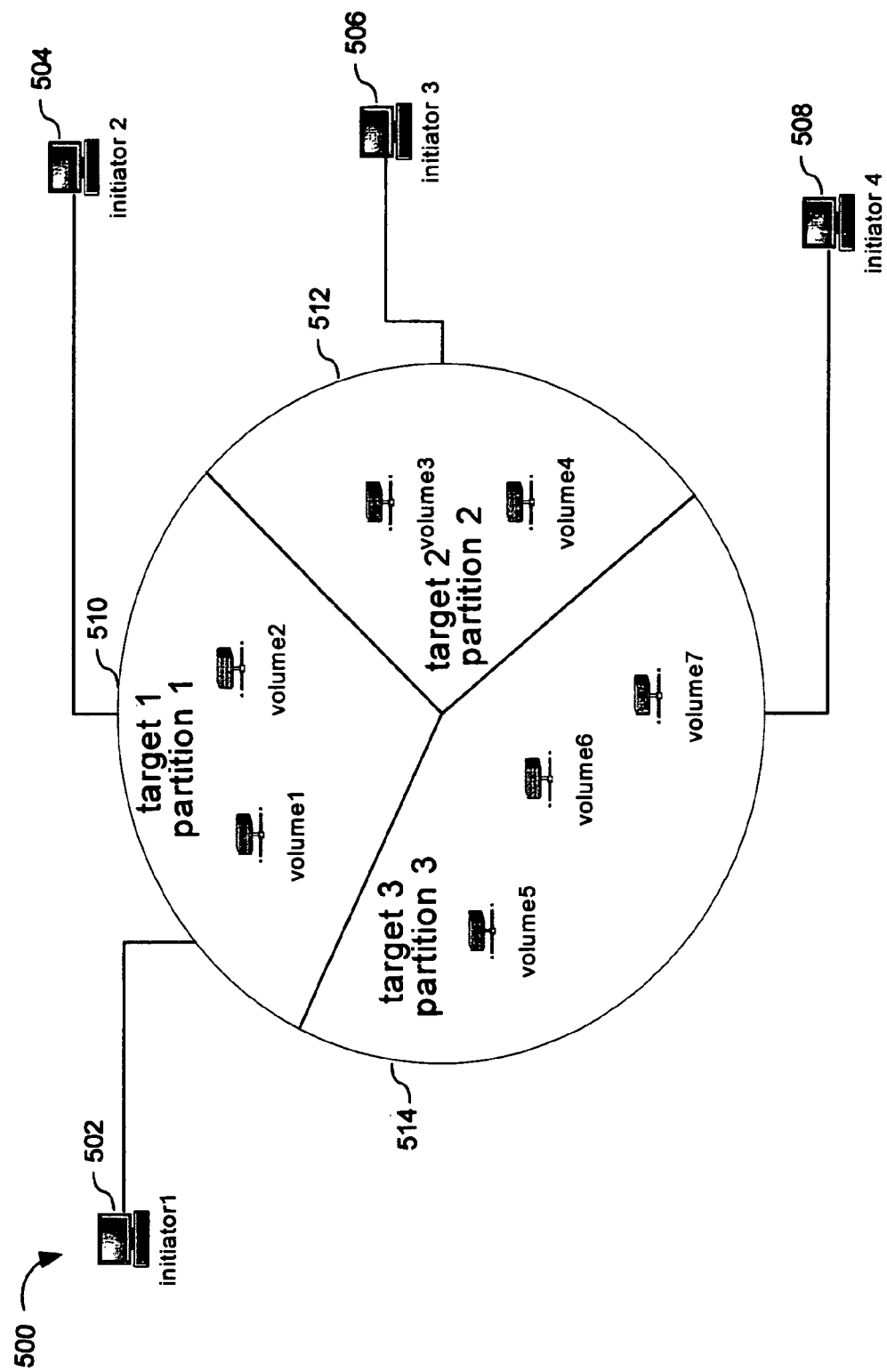
FIG. 7 is a schematic diagram of a virtual-target iSCSI implementation in accordance with an exemplary embodiment of the present invention.

Referring to FIG. 7, a virtual-target iSCSI implementation 500 in accordance with an exemplary embodiment of the present invention is disclosed. An exemplary virtual-target iSCSI implementation may include a plurality of initiators and a plurality of target devices. As illustrated in FIG. 7, the exemplary virtual-target iSCSI implementation 500 includes four initiators denoted as 502 (initiator 1), 504 (initiator 2), 506 (initiator 3), and 508 (initiator 4) as well as three target devices denoted as 510 (target 1), 512 (target 2), and 514 (target 3). As such, four initiator-target association objects may be created upon each of the initiators connecting with one of the three target devices.

In addition, as shown in FIG. 7, three storage partitions are generated by the initiator and target data. As stated previously, for supporting the virtual-target interface implementation, each of the initiator-target association objects with the same target select the same storage partition. For example, initiator 502 (initiator 1) and initiator 504 (initiator 2) connect with the same target, target 510 (target 1) and thus, select the same storage partition (i.e., partition 1). Such configuration allows the storage of data transmissions over IP networks with iSCSI using virtual-target implementations.

It is to be understood that the disclosed method allows both virtual-target and single-target interface implementations to be implemented with the same structure and algorithm in which the single-target and virtual-target implementations are unified. Such method is advantageous for it allows both single-target and virtual-target interfaces to be connected at the same time. Further, this method may be useful in system implementations in which a common software suite is used in both single-target and virtual-target systems.

It is to be noted that the foregoing described embodiments according to the present invention may be conveniently implemented using conventional general purpose digital computers programmed according to the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is to be understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for partitioning storage, the system comprising:
    at least one initiator for connecting with at least one target device;
    a plurality of initiator-target association objects, each initiator-target association object having an identical data structure created by the at least one initiator connecting with the at least one target device, the plurality of initiator-target association objects configured to be utilized for selecting one of a plurality of storage partitions, the plurality of initiator-target association objects including at least one initiator-target association object for each at least one initiator, the plurality of initiator-target association objects further including at least one initiator-target association object for each connection between the at least one initiator and the at least one target;
    at least one storage partition selected for access;
    wherein when utilizing a single-target interface implementation, the at least one storage partition for access is selected utilizing the at least one initiator-target association object for each of the at least one initiator, wherein the at least one target device is a single target device and wherein the at least one initiator is a plurality of initiators, each of the plurality of initiators are associated with the single target device, and the single target device comprises the plurality of storage partitions; and
    wherein when utilizing a virtual-target interface implementation, the at least one storage partition for access is selected utilizing the at least one initiator-target association object for each connection between the at least one initiator and the at least one target device, wherein the at least one target device is a plurality of target devices, and each of the plurality of target devices corresponds to one of the plurality of storage partitions; and
    wherein the single-target interface implementation and the virtual-target interface implementation are implemented for processing the identical data structure of the plurality of initiator-target association objects utilizing an identical computer program algorithm.

2. The system as claimed in claim 1, wherein the at least one initiator is a small computer system interface (SCSI) initiator.

3. The system as claimed in claim 1, wherein the at least one target device is a small computer system interface (SCSI) target device.

4. The system as claimed in claim 1, wherein the system for partitioning storage supports a single-target Fibre Channel implementation and a virtual-target Internet small computer system interface (iSCSI) implementation.

5. The system as claimed in claim 1, wherein the system of partitioning storage supports virtual-target Internet small computer system interface (iSCSI) implementations.

6. The system as claimed in claim 1, wherein the system of partitioning storage supports both a Fibre Channel interface and an Internet small computer system interface (iSCSI).

7. A method of partitioning storage for a system with a single-target interface and a virtual-target interface, comprising:
    connecting at least one initiator with at least one target device;
    creating a plurality of initiator-target association objects having an identical data structure, the plurality of initiator-target association objects configured to be utilized for selecting one of a plurality of storage partitions, the plurality of initiator-target association objects including an initiator-target association object for each of the at least one initiator for supporting a single-target interface implementation, the plurality of initiator-target association objects further including an initiator-target association object for each connection between the at least one initiator and the at least one target device for supporting a virtual-target interface implementation;
    when the single-target interface implementation is utilized, selecting at least one storage partition for access utilizing the initiator-target association object for each of the at least one initiator utilizing the single target interface implementation, wherein the at least one target device is a single target device and wherein the at least one initiator is a plurality of initiators, each of the plurality of initiators are associated with the single target device, and the single target device comprises the plurality of storage partitions;
    when the virtual-target interface implementation is utilized, selecting at least one storage partition for access utilizing the initiator-target association object for each connection between the at least one initiator and the at least one target device, wherein the at least one target device is a plurality of target devices, and each of the plurality of target devices corresponds to one of the plurality of storage partitions; and
    wherein the single-target interface implementation and the virtual-target interface implementation are implemented for processing the identical data structure of the plurality of initiator-target association objects utilizing an identical computer program algorithm.

8. The method as claimed in claim 7, wherein the single-target interface implementation is a single-target Fibre Channel interface implementation.

9. The method as claimed in claim 7, wherein the virtual-target interface implementation is a virtual-target Internet small computer system interface implementation.

10. The method as claimed in claim 7, wherein the at least one initiator is a small computer system interface (SCSI) initiator.

11. The method as claimed in claim 7, wherein the at least one target device is a small computer system interface (SCSI) target device.

12. The method as claimed in claim 7, wherein when utilizing the virtual-target interface implementation, at least two initiator-target association objects are configured for accessing a same storage partition of the plurality of storage partitions.

* * * * *